United States Patent
Burns et al.

(10) Patent No.: US 9,854,467 B2
(45) Date of Patent: Dec. 26, 2017

(54) METHODS AND SYSTEMS FOR DEVICE WIRELESS MODULE DIAGNOSTICS

(71) Applicant: ECHOSTAR TECHNOLOGIES L.L.C., Englewood, CO (US)

(72) Inventors: Christopher Burns, Centennial, CO (US); Jeremy Mickelsen, Denver, CO (US)

(73) Assignee: ECHOSTAR TECHNOLOGIES LLC, Englewood, CO (US)

( * ) Notice: Subject to any disclaimer, the term of this patent is extended or adjusted under 35 U.S.C. 154(b) by 31 days.

(21) Appl. No.: 14/540,923

(22) Filed: Nov. 13, 2014

(65) Prior Publication Data

US 2016/0142928 A1    May 19, 2016

(51) Int. Cl.
*H04W 24/10*    (2009.01)
*H04B 17/20*    (2015.01)
*H04W 4/00*    (2009.01)
*H04W 72/04*    (2009.01)
*H04B 17/00*    (2015.01)
(Continued)

(52) U.S. Cl.
CPC ............ *H04W 24/10* (2013.01); *H04B 17/20* (2015.01); *H04W 4/008* (2013.01); *H04W 72/04* (2013.01); *H04B 17/0087* (2013.01); *H04B 17/318* (2015.01); *H04B 17/345* (2015.01); *H04W 88/06* (2013.01)

(58) Field of Classification Search
CPC ............ G04B 15/02; H04L 2012/2849; H04N 2005/4428; H04W 24/00; H04W 24/02; H04W 24/04; H04W 24/06; H04W 24/10; H04W 4/008; H04W 72/04; H04W 88/06; H04B 14/20; H04B 17/318; H04B 17/345; H04B 17/20; H04B 17/0087
See application file for complete search history.

(56) References Cited

U.S. PATENT DOCUMENTS 4,777,633 A * 10/1988 Fletcher ................ H04W 88/08
                                                        370/286
5,313,197 A *  5/1994 Barr ..................... H04W 88/185
                                                        340/7.21
(Continued)

FOREIGN PATENT DOCUMENTS

EP    1589781 A2    10/2005
EP    2244509 A2    10/2010

OTHER PUBLICATIONS

Girish Shankarraman, Real-Time Placeshifting of Media Content to Paired Devices, filed Jun. 4, 2014, U.S. Appl. No. 13/909,895.
(Continued)

*Primary Examiner* — Luat Phung
*Assistant Examiner* — Thomas R Cairns
(74) *Attorney, Agent, or Firm* — Lorenz & Kopf LLP

(57) ABSTRACT

Methods, devices and systems are provided for diagnosing a wireless module of a device. An exemplary method involves operating a second wireless module of the device to transmit data on a second wireless channel that overlaps, at least in part, a first wireless channel. A measured response associated with the first wireless channel concurrent to the data transmitted on the second wireless channel is obtained from the first wireless module and a remedial action is initiated with respect to the first wireless module based at least in part on the measured response.

20 Claims, 4 Drawing Sheets

Figure 1:
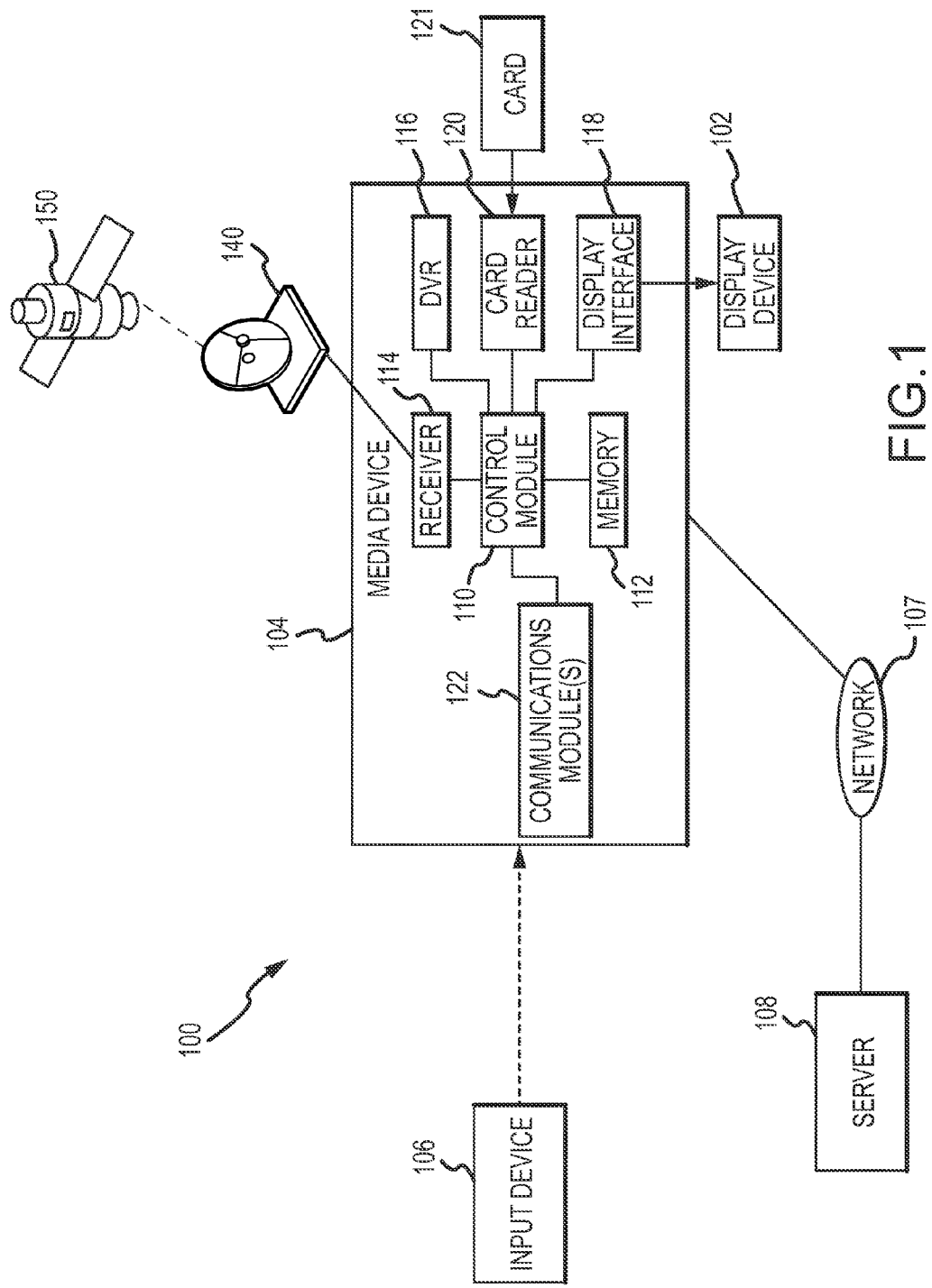

(51) Int. Cl.
*H04W 88/06* (2009.01)
*H04B 17/318* (2015.01)
*H04B 17/345* (2015.01)

(56) References Cited

U.S. PATENT DOCUMENTS

| | | | | |
|---|---|---|---|---|
| 2004/0127161 A1* | 7/2004 | Leizerovich | H04B 17/0085 | 455/67.11 |
| 2005/0157759 A1* | 7/2005 | Ohno | H04L 1/0083 | 370/535 |
| 2005/0239497 A1* | 10/2005 | Bahl | H04W 88/06 | 455/552.1 |
| 2007/0203672 A1* | 8/2007 | Desai | H04B 17/0085 | 702/189 |
| 2008/0139198 A1* | 6/2008 | Saitou | H04W 24/06 | 455/424 |
| 2012/0207030 A1* | 8/2012 | Luong | H04W 24/06 | 370/245 |
| 2012/0276853 A1* | 11/2012 | De Ruijter | H04W 24/06 | 455/67.11 |
| 2013/0225095 A1 | 8/2013 | Hong et al. | | |
| 2013/0288609 A1* | 10/2013 | Mochizuki | H04W 24/00 | 455/67.11 |
| 2014/0241168 A1* | 8/2014 | Merlin | H04L 1/0003 | 370/241 |
| 2016/0080821 A1* | 3/2016 | Makhijani | H04N 21/47202 | 725/5 |
| 2016/0095192 A1* | 3/2016 | Vangeel | F24F 11/006 | 315/153 |

OTHER PUBLICATIONS

Christopher William Bruhn, Methods and Systems for Placeshifting Data with Interference Mitigation, filed Dec. 19, 2013, U.S. Appl. No. 14/134,366.

3GPP Draft, 3rd Generation Partnership Project; Technical Specification Group Radio Access Networks; Evolved Universal Terrestrial Radio Access (E-UTRA); Study on signaling and procedure for interference avoidance for in-device coexistence; (Release 10), 3rd Generation Partnership Project, Mobile Competence Center; 650, Route Des Lucioles; F-06921 Sophia-Antipolis Cedex; France, May 15, 2014, Retrieved from the internet: http://www.3gpp.org/ftp/tsg_ran/WG2_RL2/R2TSs_TRs_early_versions/History/TR36.816_IDC/v1.0.0/ on May 15, 2014.

European Search Report, EP Application No. 15194092.1, dated Mar. 2, 2016.

* cited by examiner

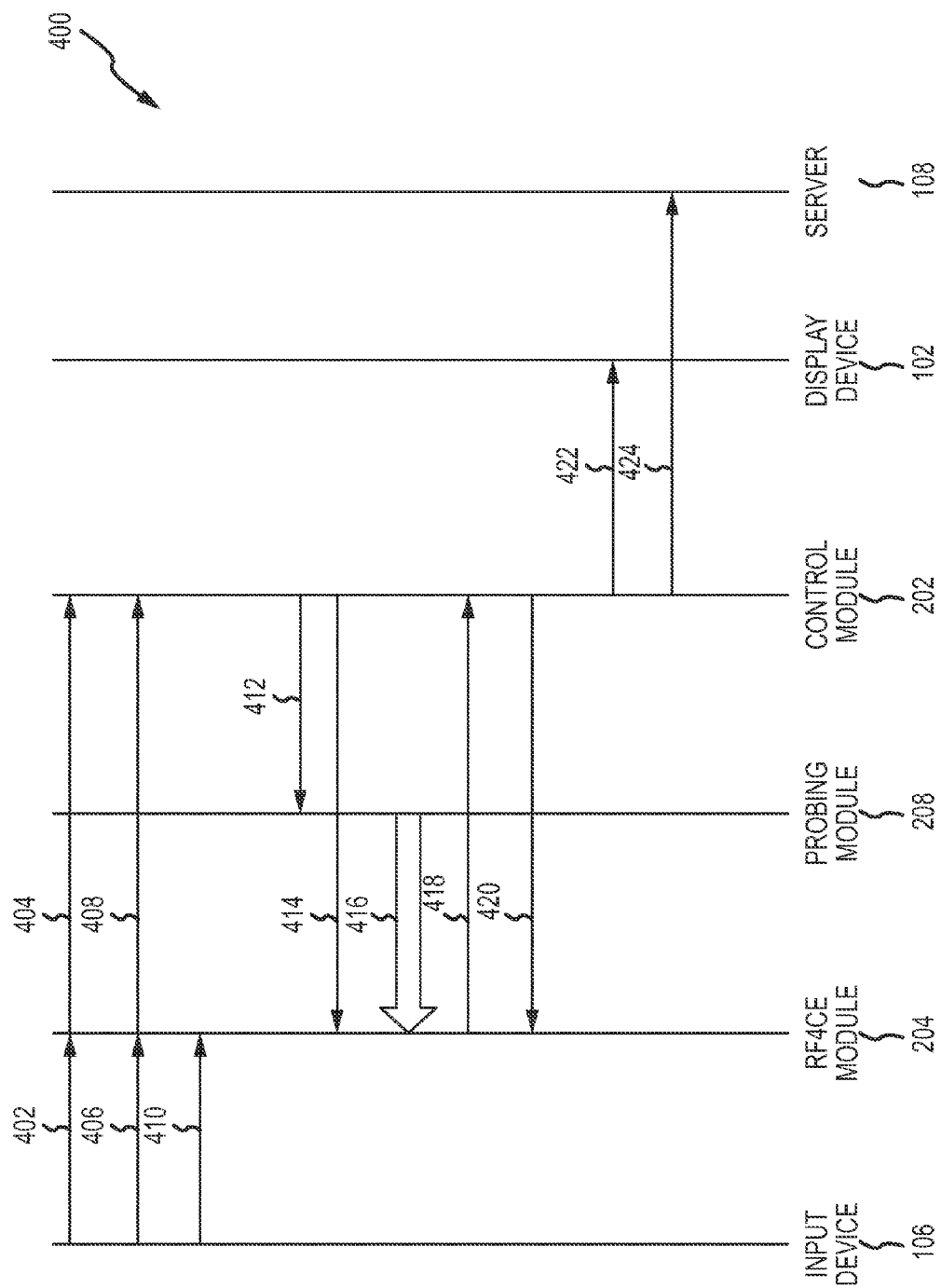

METHODS AND SYSTEMS FOR DEVICE WIRELESS MODULE DIAGNOSTICS

TECHNICAL FIELD

The following description generally relates to diagnosing the functionality of a wireless communications module of an electronic device.

BACKGROUND

In recent times, wireless communications have become ubiquitous and have replaced or surpassed many previous communications technologies. For example, many devices that previously utilized infrared data transmission now utilize a wireless communications protocol instead, such as, ZigBee® radio frequency for consumer electronics (RF4CE) or Bluetooth®. In practice, hardware faults, software faults, electrostatic discharge events, and the like can impair wireless communications between two devices and degrade the user experience. However, these problems may be difficult for most users to recognize, diagnose, and fix (particularly when multiple devices or more complex communications systems are involved), and having to contact customer service or other repair personnel and schedule a maintenance appointment further degrades the user experience. Accordingly, it is desirable to proactively diagnose and address wireless communications problems in a manner that minimizes the impact on the user experience. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for diagnosing a wireless module of a device. One exemplary method involves operating a second wireless module of the device to transmit data on a second wireless channel, obtaining, from the wireless module being diagnosed, a measured response associated with the first wireless channel concurrent to the data transmitted on the second wireless channel by the second wireless module, and initiating a remedial action with respect to the wireless module based at least in part on the measured response. At least a portion of the second wireless channel overlaps at least a portion of the first wireless channel.

In other embodiments, an apparatus for an electronic device is provided. The device includes a first wireless module to communicate on a first wireless channel, a second wireless module, and a control module coupled to the first wireless module and the second wireless module. The device control module is configured to operate the second wireless module to transmit data on a second wireless channel, obtain a measured response associated with the first wireless channel concurrent to the data transmitted on the second wireless channel from the first wireless module, and initiate a reset of the first wireless module based at least in part on the measured response. At least a portion of the second wireless channel overlaps at least a portion of the first wireless channel.

In another embodiment, a media system includes an input device to communicate via a first wireless channel and a media device. The media device includes a first wireless module to communicate with the input device via the first wireless channel, a second wireless module, and a control module coupled to the first wireless module and the second wireless module. The control module is configured to operate the second wireless module to transmit data on a second wireless channel and obtain, from the first wireless module, a measured response associated with the first wireless channel concurrent to the data transmitted on the second wireless channel. At least a portion of the second wireless channel overlaps at least a portion of the first wireless channel, and the control module initiates a reset of the first wireless module based at least in part on the measured response.

Various embodiments, aspects and other features are described in more detail below.

BRIEF DESCRIPTION OF THE DRAWING FIGURES

Figure 2:
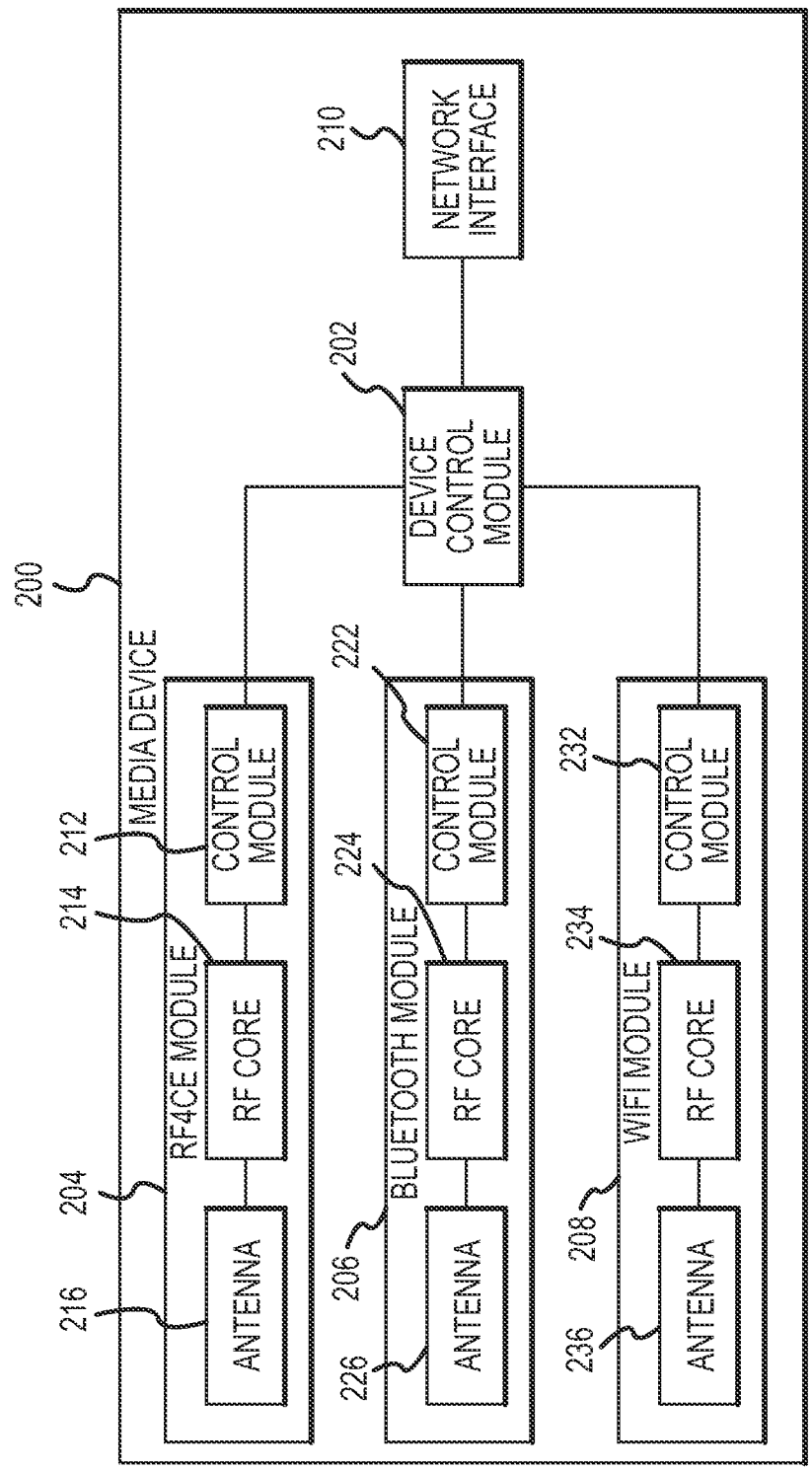
Figure 3:
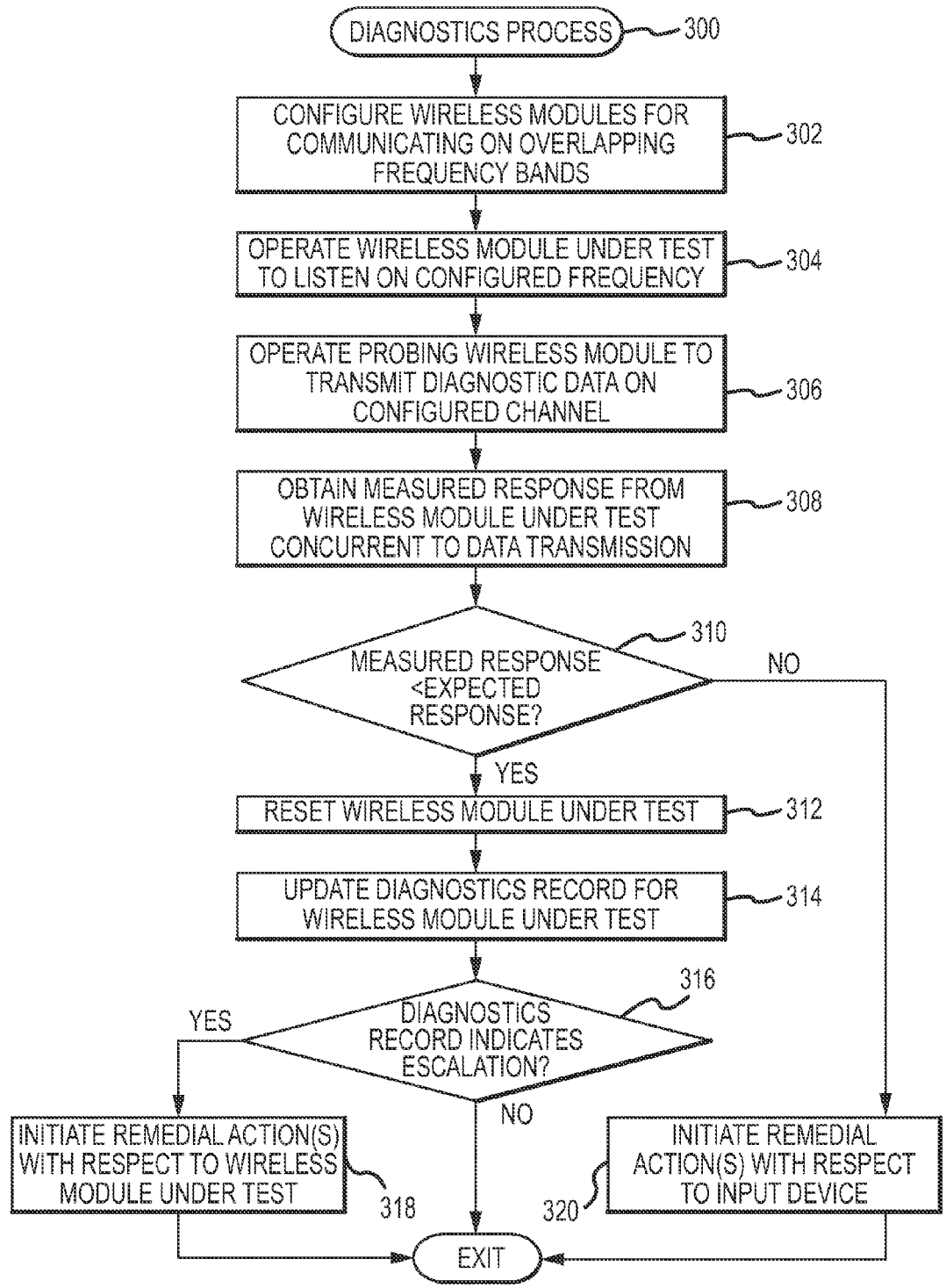

Exemplary embodiments will hereinafter be described in conjunction with the following drawing figures, wherein like numerals denote like elements, and FIG. 1 is a block diagram of a media system in accordance with one or more embodiments;

FIG. 2 is a block diagram of a media device suitable for use in the media system of FIG. 1 in accordance with one or more embodiments;

FIG. 3 is a flowchart of an exemplary diagnostics process suitable for implementation by the media device of FIG. 2 in the media system of FIG. 1 in accordance with one or more embodiments; and FIG. 4 is a diagram illustrating a sequence of communications involving the media device of FIG. 2 in the media system of FIG. 1 in accordance with one exemplary embodiment of the diagnostics process of FIG. 3.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to diagnosing a communications module of an electronic device. For purposes of explanation, the subject matter may be described herein in the context of diagnosing a wireless communications module of a media device, such as a set-top box, a placeshifting device, television receiver, a media player, or the like. However, it should be appreciated that the subject matter described herein is not necessary limited to wireless communications or any particular type of device and may be implemented in an equivalent manner for any electronic device that includes any type and number of communications modules.

In exemplary embodiments described herein, a media device self-diagnoses the functionality of a wireless module that communicates with an external device using another wireless module of the media device. For example, the media device may include multiple different wireless modules configured to support multiple different communications protocols that overlap, at least in part, on the radio frequency spectrum. To diagnose a first wireless module communicating on a first wireless channel, a control module of the media device operates a second wireless module of the device to transmit diagnostic data on a second wireless channel that overlaps, at least in part, the first wireless channel. The control module also operates the first wireless module to monitor the first wireless channel concurrent to the diagnostics data transmission and obtain a measured response associated with the first wireless channel that is expected to be influenced, at least in part, by the diagnostics data. The control module analyzes the measured response and automatically initiates a remedial action with respect to the first wireless module based at least in part on the measured response. For example, if the measured energy level on the first wireless channel is sufficiently below an expected energy level on the first wireless channel given the diagnostics data transmission on the overlapping wireless channel, the control module may automatically reset, restart, or otherwise reinitialize the first wireless module. In this manner, potential anomalous conditions with a wireless module may be self-diagnosed and resolved by the media device in a manner that does not further degrade the user experience. For example, the user does not need to schedule a maintenance appointment or inspect, restart or power cycle the media device while viewing and/or recording a broadcast media program. When the measured response matches the expected response, the control module may determine the wireless module is functioning normally and automatically initiate some other remedial action as appropriate.

FIG. 1 depicts a media system 100 configured to present a media program (or media content) on a display device 102 associated with a media device 104. As used herein, "media content," "media program," or variants thereof should be understood as referring to any audio, video, audio/visual or other programming in any streaming, file-based or other format. The media device 104 is communicatively coupled to an input device 106 that functions as a user interface enabling user interaction with the media device 104 to control, manipulate, or otherwise influence the operation of the media device 104 and/or the content presented on the display device 102.

The input device 106 is realized as an electronic device that is paired or otherwise associated with the media device 104 in a manner that allows the input device 106 to control operation of the media device 104. In exemplary embodiments, the input device 106 is realized as a remote control associated with the media device 104 that communicates with the media device 104 wirelessly in a point-to-point manner. However, in other embodiments, the input device 106 may be realized as a mobile telephone, a laptop or notebook computer, a tablet computer, a desktop computer, a personal digital assistant, a video game player, a portable media player, a thermostat, a light switch, and/or any other computing device capable of communicating with the media device 104. That said, for purposes of explanation, the input device 106 may be described herein in the context of a remote control paired with the media device 104. In exemplary embodiments, the input device 106 includes one or more user input elements for receiving input from a viewer of the display device 102 that is in possession of the input device 106. The user input elements may include, for example, one or more buttons, keys, keypads, keyboards, directional pads, joysticks, pointers, mice, touch panels or other touch-sensing elements, or the like. In exemplary embodiments, input received by the input element may be replicated or otherwise presented on the display device 102. For example, a position of a graphical user interface (GUI) element on the display device 102, such as a pointer or cursor, may be correlated with the user input on the input element.

The input device 106 includes at least one wireless communications module configured to support communications with the media device 104 over a wireless communications channel. For example, the input device 106 may be realized as a remote control that includes a wireless communications module that supports wireless communications over an unlicensed radio band, such as, for example, using a 2.4 GHz carrier frequency in accordance with an IEEE 802.15.4 protocol, such as the ZigBee® radio frequency for consumer electronics (RF4CE) specification. Additionally or alternatively, the input device 106 may also include one or more wireless communications modules configured to support wireless communications with the media device 104 in accordance with a Bluetooth® specification, an IEEE 802.11 specification, or the like. That said, for purposes of explanation and without limitation, exemplary embodiments may be described herein in the context of the input device 106 being realized as a remote control that wirelessly communicates with the media device 104 in a point-to-point or peer-to-peer manner using RF4CE protocols.

Still referring to FIG. 1, in the illustrated embodiment, the media device 104 is any electronic device, hardware, or other component capable of receiving and processing media content and providing media content to the display device 102 for presentation on the display device 102. The display device 102 generally represents a television, monitor, liquid crystal display (LCD), light emitting diode (LED) display, plasma display, or the like that graphically presents, renders, or otherwise displays imagery and/or video corresponding to media content provided by the media device 104. In exemplary embodiments, the media device 104 is a set-top box (STB) or similar system that is able to receive television programming and/or to record certain media programs. Exemplary embodiments of media device 104 will therefore include a receiver interface 114 for receiving satellite, cable and/or broadcast programming signals from broadcast content sources 150, as well as a data storage medium 116 (e.g., a hard disk, flash memory, or another suitable non-volatile data storage element) to support a digital video recorder (DVR) feature and/or functionality, and a display interface 118 for providing imagery and/or video corresponding to a media program to the display device 102. For convenience, but without limitation, the data storage medium 116 is alternatively referred to herein as a DVR. In some embodiments, the media device 104 may also include an access card interface or card reader 120 adapted to receive an access card 121 (or viewing card) configured to ensure that the viewer is authorized to view media content provided to the display device 102. In this regard, the access card 121 may include unique identification information associated with a particular subscriber to the broadcast content source 150 or otherwise include information that facilitates receiving and/or decoding media content provided by the broadcast content source 150.

The media device 104 also includes a plurality of communications modules 122 configured to support communications to/from the media device 104, as described in greater detail below in the context of FIG. 2. In this regard, the media device 104 includes at least one wireless communications module configured to support wireless communications with the input device 106. For example, the media device 104 may include a RF4CE module configured to support wireless communications with the remote control 106 in accordance with the RF4CE specification. In exemplary embodiments, the media device 104 also includes one or more additional wireless communications modules configured to support the diagnostics process 300, as described in greater detail below in the context of FIGS. 2-3. Additionally, in the illustrated embodiment of FIG. 1, at least one of the communications modules 122 of the media device 104 is configured to support communications with a remote server 108 via a communications network 107. For example, one of the communications modules 122 may be realized as a cellular transceiver, a wired network interface controller (e.g., an Ethernet adapter), or another suitable network interface. As described in greater detail below in the context of FIGS. 3-4, in one or more embodiments, the remote server 108 may be configured to receive diagnostics information from the media device 104, maintain diagnostics records for the communications modules 122 of the media device 104, and/or automatically facilitate maintenance or other remedial actions with respect to a communications module 122 of the media device 104.

It should be appreciated that FIG. 1 depicts merely one exemplary embodiment of a media device 104, and in practice, the media device 104 may be physically and/or logically implemented in any manner to suit the needs of a particular embodiment. In this regard, in some embodiments, the components in media device 104 may be provided within a common chassis or housing as illustrated in FIG. 1, although equivalent embodiments may implement media device 104 with any number of inter-connected but discrete components or systems. For example, in some embodiments, the media device 104 may be realized as a combination of a STB and a placeshifting device, wherein some features of the media device 104 (e.g., the DVR 116, the receiver 114, the display interface 118, communications modules 122) are implemented by the STB and other features of the media device 104 (e.g., the network interface 124) are implemented by the placeshifting device, wherein the placeshifting device works in conjunction with the STB to shift the viewing experience from a home television (e.g., display device 102) to another display that is accessed via network (e.g., network 107). Examples of placeshifting devices that may be used in some embodiments of media device 104 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 104 may be a hybrid DVR and/or receiver, for example, that also provides transcoding and placeshifting features.

Still referring to FIG. 1, in the illustrated embodiment, media device 104 is capable of receiving digital broadcast satellite (DBS) signals transmitted from a broadcast source 150, such as a satellite, using an antenna 140 that provides received signals to the receiver 114. Equivalent embodiments, however, could receive programming at receiver 114 from any sort of cable connection, broadcast source, removable media, network service, external device and/or the like. The DVR 116 feature stores recorded programming (e.g., broadcast programming received via receiver 114) on a hard disk drive, memory, or other storage medium as appropriate in response to user/viewer programming instructions, wherein the recorded programming may be subsequently viewed on display device 102 or placeshifted to another client device via a network. Content stored in DVR 116 may be any sort of file-based programming or other content that is accessible to media device 104. Additionally, media content in DVR 116 may be stored in any sort of compressed or uncompressed format, as desired, and may be encoded or transcoded as desired for effective receipt, storage, retrieval and playing.

Still referring to FIG. 1, the media device 104 includes a control module 110 configured to direct, manage, or otherwise control the operations of the media device 104 as appropriate. The control module 110 may be realized as any suitable combination of hardware, firmware, and/or other components of the media device 104 capable of directing, managing or otherwise controlling the operations of media device 104. The control module 110 may be realized using any suitable processing system, processing device, or combination thereof. For example, the control module 110 may include one or more processors, central processing units (CPUs), graphics processing units (GPUs), controllers, microprocessors, microcontrollers, processing cores and/or other computing resources configured to support the subject matter described herein. The media device 104 also includes a data storage element (or memory) 112 that is coupled to or otherwise accessed by the control module 110. The memory 112 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 110. The stored programming instructions, when read and executed by the control module 110, cause the control module 110 to perform various tasks, functions, and/or processes to control operations of the media device 104 and support the diagnostics process 300 described in greater detail below in the context of FIG. 3. In some embodiments, the control module 110 is implemented as a "system on a chip" (SoC) that incorporates a hybrid microcontroller with memory, input/output and other features to perform the various processing and other functionality of media device 104, and in which case a separate memory 112 may not be provided.

FIG. 2 depicts an exemplary embodiment of a media device 200 suitable for use as the media device 104 in the media system 100 of FIG. 1 in accordance with one or more embodiments. The media device 200 includes, without limitation, a control module 202 (e.g., control module 110), a plurality of wireless communications modules 204, 206, 208, and a network interface 210 (or network communications module). As described in greater detail below in the context of FIGS. 3-4, in exemplary embodiments, the control module 202 is configured to diagnose the functionality of a first wireless module 204, 206, 208 using one or more of the other wireless modules 204, 206, 208 and initiate one or more remedial actions based on the diagnosis. It should be understood that FIG. 2 is a simplified representation of the media device 200 for purposes of explanation and is not intended to limit the subject matter described herein in any way. In this regard, although FIG. 2 depicts the modules 202, 204, 206, 208, 210 as physically distinct and separate elements (e.g., on separate semiconductor dies), in practice, one or more of the modules 202, 204, 206, 208, 210 may be integrated with one or more of the other modules 202, 204, 206, 208, 210 (e.g., on a common semiconductor die).

In exemplary embodiments, the wireless communications modules 204, 206, 208 is configured to support wireless communications in accordance with a wireless communications protocol or specification that is different from that of the other wireless communications modules 204, 206, 208. For example, in the illustrated embodiment, the first wireless module 204 is configured to support communications in accordance with the RF4CE specification or another ZigBee® specification, the second wireless module 206 is configured to support communications in accordance with a Bluetooth® specification, and the third wireless module 208 is configured to support communications in accordance with an IEEE 802.11 specification (e.g., WiFi). That said, in alternative embodiments, one or more of the wireless modules 204, 206, 208 may be configured to support communications in accordance with the same protocol or specification. The network interface 210 generally represents the hardware, circuitry and/or other components of the media device 200 configured to support communications over a network (e.g., network 107), such as, for example, a cellular transceiver, a wired network interface controller (e.g., Ethernet), a coaxial transceiver interface, or the like.

The illustrated wireless communications modules 204, 206, 208 include, without limitation, a communications control module 212, 222, 232 configured to interface with the device control module 202 and support operations of its respective wireless module 204, 206, 208, an antenna 216, 226, 236, and a radio frequency (RF) core 214, 224, 234 coupled between its respective antenna 216, 226, 236 and its respective control module 212, 222, 232. In this regard, the RF core 214, 224, 234 represents the hardware, circuitry and/or other components of the respective wireless module 204, 206, 208 configured to convert digital baseband signals to analog radio frequency signals to be transmitted via the respective antenna 216, 226, 236 and convert analog radio frequency signals received via the respective antenna 216, 226, 236 to corresponding digital baseband signals. In this regard, each RF core 214, 224, 234 may include one or more mixers, frequency doublers, frequency dividers, baluns, mixers, amplifiers, transmitters, receivers, transceivers, or the like. It should be noted that although FIG. 2 depicts separate antennas 216, 226, 236 for each of the wireless modules 204, 206, 208 coupled to the separate RF cores 214, 224, 234 for each of the wireless modules 204, 206, 208, in alternative embodiments, the antennas 216, 226, 236 may be shared, combined, or otherwise multiplexed across more than one wireless module 204, 206, 208 or otherwise utilized to support more than one communications protocol.

Each of the communications control modules 212, 222, 232 may be realized as any suitable combination of hardware, firmware, and/or other components configured to provide an interface to/from its respective wireless module 204, 206, 208 and support the operations of its respective wireless module 204, 206, 208 described herein. In this regard, the communications control modules 212, 222, 232 may include or otherwise be realized using any suitable processing system, processing device, or combination thereof, such as, for example, one or more processors, controllers, microprocessors, microcontrollers, processing cores or the like. Additionally, each of the communications control modules 212, 222, 232 may include or otherwise access a data storage element or other non-transitory computer (or machine) readable medium that stores programming instructions that, when read and executed, cause the respective control module 212, 222, 232 to perform various tasks, functions, processes and/or operations and support the subject matter described herein.

In exemplary embodiments described herein, at least two of the wireless modules 204, 206, 208 are configured to communicate over the same frequency band (or range) or otherwise communicate over a wireless communications channel that overlaps a wireless communications channel of another wireless module 204, 206, 208. For example, each of the wireless modules 204, 206, 208 may communicate on the 2.4 GHz frequency band using discrete channels having a designated or recognized center frequency within the 2.4 GHz frequency band. For example, the first wireless module 204 utilize the RF4CE wireless communications channel 15, which is centered on 2.425 GHz with a channel width of 2 MHz, while the second wireless module 206 may utilize Bluetooth channel 38, which is centered on 2.426 GHz with a channel width of 1 MHz that overlaps RF4CE channel 15, or the third wireless module 208 may utilize 802.11 channel 3, which is centered on 2.422 GHz with a channel width of 20 MHz that overlaps RF4CE channel 15. To put it another way, the wireless modules 204, 206, 208 may communicate on different, yet overlapping, wireless communications channels within a common frequency band (e.g., the 2.4 GHz frequency).

FIG. 3 depicts an exemplary embodiment of a diagnostics process 300 for diagnosing the functionality of a wireless communications module in an electronic device, such as media device 104, 200 in the media system 100 of FIG. 1. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the diagnostics process 300 may be performed by different elements of a media system 100, such as, for example, the media device 104, the input device 106, the server 108, the device control module 110, 202, the communications modules 122, 204, 206, 208, 210, the display interface 118, the communications control modules 212, 222, 232, the RF cores 214, 216, 218 and/or the antennas 216, 226, 236. It should be appreciated that the diagnostics process 300 may include any number of additional or alternative tasks, the tasks need not be performed in the illustrated order and/or the tasks may be performed concurrently, and/or the diagnostics process 300 may be incorporated into a more comprehensive procedure or process having additional functionality not described in detail herein. Moreover, one or more of the tasks shown and described in the context of FIG. 3 could be omitted from a practical embodiment of the diagnostics process 300 as long as the intended overall functionality remains intact.

Referring to FIG. 3, and with continued reference to FIGS. 1-2, in exemplary embodiments described herein, the diagnostics process 300 is initiated by the media device control module 110, 202 to diagnose the functionality of a wireless communications module 204, 206, 208 and verify or otherwise confirm that the wireless communications module 204, 206, 208 is operating as expected. In some embodiments, the diagnostics process 300 may be initiated periodically for each of the wireless modules 204, 206, 208 of the media device 104, 200. For example, the device control module 202 may automatically initiate the diagnostics process 300 to test the functionality of each of the wireless modules 204, 206, 208 at a predetermined time every day (e.g., overnight or some other time when the user is not utilizing the media device 104, 200 to view media content on the display 102) or at regular periodic intervals (e.g., every 8 hours).

In exemplary embodiments described herein, the device control module 110, 202 automatically initiates the diagnostics process 300 to diagnose the RF4CE module 204 in response to detecting or otherwise identifying an absence of communications with the input device 106. For example, depending on the embodiment, the input device 106 may be configured to periodically poll the media device 104, 200 by transmitting a status message to the media device 104, 200 (e.g., a heartbeat message, a data poling message, a media access control (MAC) polling message, a ping/pong message, or the like), or alternatively, the media device 104, 200 may periodically poll the input device 106 by transmitting a request message to the media device 104, 200, with the input device 106 providing the status message in response to receiving the request message. When the RF4CE module 204 is functioning as expected, the status message transmitted by the input device 106 is received by the RF4CE control module 212 via the antenna 216 and RF core 214 and retransmitted, rerouted, or otherwise relayed to the device control module 202. In various embodiments, the device control module 202 may store or otherwise maintain the status message and/or metadata associated therewith (e.g., signal strength, time, and the like) for future diagnostics, or the device control module 202 may utilize the status messages to support over-the-air downloads or automatic updates, remote locate functionality, power management features of the input device 106, and the like. In response to detecting the absence of receiving a status message from the input device 106 at the expected periodic interval, the device control module 110, 202 may automatically initiate the diagnostics process 300 with respect to the RF4CE module 204.

The diagnostics process 300 begins by configuring the device wireless module under test and another wireless module of the device for communications on overlapping frequency bands (task 302). In this regard, to diagnose the functionality of the RF4CE module 204, the device control module 202 configures one of the other wireless communications modules 206, 208 of the media device 104, 200 for communicating on a wireless communications channel that overlaps, at least in part, the wireless communications channel that the RF4CE module 204 is configured for. For purposes of explanation, the wireless communications module used to diagnose the wireless communications module under test may alternatively be referred to herein as the probing wireless module, and the wireless communications channel utilized by the probing wireless module to diagnose the wireless module under test may alternatively be referred to herein as the probing channel. In accordance with one embodiment, the device control module 202 automatically selects the wireless communications module 206, 208 to be used as the probing wireless module based on one or more selection criteria. For example, a utilization metric (e.g., a current data rate, an amount of data sent/received over a preceding interval, or the like) may be utilized as a selection criterion, with the device control module 202 automatically selecting the wireless communications module 206, 208 with the lowest value for the utilization metric for use as the probing module. In this regard, if the Bluetooth module 206 is not currently paired with any other devices while the WiFi module 208 is periodically being utilized, the device control module 110, 202 may automatically select the Bluetooth module 206 for use as the probing module based on its utilization metric indicating it is not being as heavily or as frequently utilized as the WiFi module 208. Conversely, if the Bluetooth module 206 is currently paired with another device while the WiFi module 208 is not being utilized (or is transmitting data at a lower rate or frequency than the Bluetooth module 206), the device control module 110, 202 may automatically select the WiFi module 208 for use as the probing module. It should be appreciated that numerous possible selection criteria exists, and the subject matter described herein is not intended to be limited to any particular type of selection criteria or selection scheme.

In accordance with one or more embodiments, the device control module 110, 202 automatically commands, signals, or otherwise instructs the probing module to operate on a supported wireless communications channel that overlaps the wireless communications channel that the module under test is currently configured for without adjusting, changing, retuning, or otherwise reconfiguring the module under test. In this regard, the device control module 110, 202 may obtain the current channel information from the wireless module under test, identify the supported wireless communications channel of the probing wireless module to be used as the probing channel, and instruct the probing wireless module to tune itself to that identified channel. In one embodiment, the device control module 110, 202 selects the probing channel from among a plurality of wireless channels of the protocol supported by the probing wireless module based on the amount of overlap between the probing channel and the wireless channel utilized by the module under test being greater than the amount of overlap of the remaining wireless channels supported by the probing module. In other embodiments, the device control module 110, 202 selects the channel that is closest to the wireless channel utilized by the module under test for use as the probing channel based on the difference between the center frequency of that channel and the wireless channel utilized by the module under test being less than the difference between the respective center frequencies of the remaining wireless channels supported by the probing module.

For example, when the RF4CE module 204 under test is operating on RF4CE wireless communications channel 15 and Bluetooth module 206 is selected as the probing module, the device control module 110, 202 may identify Bluetooth channel 38 as being the supported channel having a center frequency closest to the center frequency of RF4CE channel 15 and command, signal, or otherwise instruct the Bluetooth control module 222 to tune or otherwise configure the RF core 224 for channel 38. Similarly, if the WiFi module 208 were selected as the probing module, the device control module 110, 202 may identify 802.11 channel 4 as being the supported channel having a center frequency closest to the center frequency of RF4CE channel 15 and command, signal, or otherwise instruct the WiFi control module 232 to tune or otherwise configure its associated RF core 234 for channel 4.

In some embodiments, the device control module 110, 202 may automatically command or instruct the module under test to operate on a supported wireless communications channel that is not currently in use, before commanding or instructing the probing module for a channel that overlaps that wireless communications channel of the module under test that was not previously in use. In this regard, the device control module 110, 202 may obtain the current channel information from the wireless module under test, identify the supported wireless communications channel that is least likely to be in use by other devices that could otherwise interfere with the diagnostics process 300. For example, if the RF4CE module 204 under test was previously communicating with the input device 106 on RF4CE channel 15, the device control module 110, 202 may identify or otherwise select RF4CE channel 20 or RF4CE channel 25 for use for the purposes of the diagnostics process 300 and command, signal, or otherwise instruct the RF4CE control module 212 to tune or otherwise configure the RF core 214 for the selected channel. Thereafter, the device control module 110, 202 configures the selected probing module for an overlapping channel. For example, when the RF4CE module 204 under test has been configured for RF4CE channel 20 (with a center frequency of 2.450 GHz) for diagnostic purposes and Bluetooth module 206 is selected as the probing module, the device control module 110, 202 may identify Bluetooth channel 22 as the probing channel based on its center frequency of 2.450 GHz being the same as that of RF4CE channel 20, and thereafter command, signal, or otherwise instruct the Bluetooth control module 222 to tune or otherwise configure the RF core 224 for channel 22. Similarly, if the WiFi module 208 were selected as the probing module, the device control module 110, 202 may identify 802.11 channel 9 as being the probing channel having a center frequency (e.g., 2.452 GHz) closest to the center frequency of RF4CE channel 20, and thereafter command, signal, or otherwise instruct the WiFi control module 232 to tune or otherwise configure its associated RF core 234 for channel 9.

In yet other embodiments, the device control module 110, 202 may automatically command or instruct the module under test to operate on a supported wireless communications channel that overlaps the wireless communications channel that the probing module is currently configured for without changing, retuning, or otherwise reconfiguring the probing module. For example, if the Bluetooth module 206 is selected as the probing module and the Bluetooth module 206 is currently paired with another device on Bluetooth channel 35 (with a center frequency of 2.476 GHz), the device control module 110, 202 may identify RF4CE channel 25 as being closest to the probing channel based on its center frequency of 2.475 GHz, and thereafter command, signal, or otherwise instruct the RF4CE control module 212 to tune or otherwise configure the RF core 214 for channel 25. Similarly, if the WiFi module 208 is selected as the probing module and is currently configured for one of 802.11 channels 7-10, the device control module 110, 202 may identify RF4CE channel 25 as being the supported channel that overlaps at least a portion of the probing channel bandwidth, and thereafter command, signal, or otherwise instruct the RF4CE control module 212 to tune or otherwise configure the RF core 214 for channel 25.

After configuring the wireless modules so that the module under test and the probing module are communicating on overlapping channels, the diagnostics process 300 continues by operating the wireless module under test to listen, monitor, or otherwise assess traffic on its configured channel while concurrently operating the probing wireless module to transmit diagnostic data on its configured channel (tasks 304, 306). In this regard, the wireless module under test obtains a measured response indicative of the data communications and/or traffic on its current channel, which is likely be influenced, at least in part, by the concurrent transmission of diagnostic data by the probing wireless module on an overlapping channel when the module under test is functioning normally.

In exemplary embodiments, the device control module 110, 202 commands or otherwise instructs the module under test to monitor or assess data communications on its configured channel in a manner that ensures the module under test is monitoring its configured channel concurrent to at least some of the diagnostic data transmission by the probing module. In this regard, the device control module 110, 202 may instruct the module under test to perform a channel assessment or another similar operation with respect to its configured channel for a duration of time that is greater than or equal to the duration of time during which the probing module will transmit diagnostic data. For example, the device control module 110, 202 may instruct the RF4CE module 204 to perform a clear channel assessment continuously for the maximum duration of time allowed by the applicable protocols or specifications governing its communications. In some embodiments, the device control module 110, 202 may instruct the RF4CE module 204 to perform a clear channel assessment synchronously or simultaneously to instructing the probing module 206, 208 to transmit diagnostic data.

In other embodiments, the device control module 110, 202 may instruct the RF4CE module 204 to perform the clear channel assessment continuously or repeatedly for the expected duration of time of the diagnostic data transmission by the probing module 206, 208. For example, if the timeout time associated with the clear channel assessment or energy detection for the applicable protocol is relatively short (e.g., in comparison to the maximum allowable duration for the diagnostic data transmission), the device control module 110, 202 may instruct the under test module 204 to repeatedly perform the assessment over the duration of the diagnostic data transmission to obtain a set of measurement data samples. In such embodiments, the device control module 110, 202 may perform statistical analysis of the measurement data samples to the maximum measured response, the median measured response, the average measured response, and/or another statistical measured response. In some embodiments, measurement data samples may be obtained when the diagnostic data is not being transmitted to provide a reference response or otherwise normalize the measured response.

In exemplary embodiments, the device control module 110, 202 also commands or otherwise instructs the probing wireless module to transmit dummy data or test data on its configured channel in a manner that ensures the module under test will monitor its configured channel concurrently for at least some of the data transmission by the probing module. For example, the device control module 110, 202 may instruct the probing module 206, 208 to transmit dummy data for a particular duration of time (or alternatively, an amount of data that entails at least that particular duration of time for transmission) that is greater than or equal to the duration of time during which the RF4CE module 204 will monitor its configured channel. For example, the device control module 110, 202 may instruct the probing module 206, 208 to transmit a dummy packet of data having a packet length or size that is equal to the maximum packet length allowed by the applicable protocols or specifications governing its communications. In this regard, the device control module 110, 202 may instruct the RF4CE module 204 to perform a clear channel assessment for the duration of time corresponding to the expected amount of time required for the probing module 206, 208 to transmit a data packet having that maximum packet length. It should be noted that there are numerous ways to configure the probing module's data transmission to concur with the module under test's channel assessment, and the subject matter described herein is not limited to any particular manner for configuring the two to overlap in time.

Still referring to FIG. 3, the diagnostics process 300 receives or otherwise obtains the measured response from the wireless module under test and analyzes the measured response to identify or otherwise determine whether the wireless module under test is functioning normally (tasks 308, 310). As described above, the wireless module under test obtains the measured response concurrent to the data transmission by the probing wireless module, and therefore, the measured response may be compared to an expected response from the wireless module under test for the diagnostic data transmission by the probing wireless module to determine whether the wireless module under test is functioning normally. In this regard, when the measured response is less than the expected response, the diagnostics process 300 determines a potential anomalous condition exists with respect to the module under test and initiates one or more remedial actions with respect to the module under test, as described in greater detail below. Although the subject matter is described herein in the context of identifying an anomalous condition based on the difference in magnitude of the measured response relative to the expected response, in alternative embodiments, the diagnostics process 300 may analyze the measured response for frequency drift by one of the wireless modules. In such embodiments, when the measured response is indicative of frequency drift, the diagnostics process 300 determines a potential anomalous condition exists and initiates one or more remedial actions with respect to the module under test.

In one or more embodiments, the control module 110, 202 calculates an expected energy detection level for the probing channel based on one or more characteristics of the dummy data transmitted by the probing wireless module, such as, for example, the amount of data transmitted or the bandwidth of the transmission, the duration or timing of the dummy data transmission, the carrier frequency of the probing channel, the bandwidth overlap between the probing channel and the channel being monitored by the module under test, the transmit power level, the modulation scheme utilized for the dummy data transmission, and the like. Additionally, the control module 110, 202 may account for the physical location or other physical relationship of the probing wireless module with respect to the module under test. When the probing module or the module under test can be repositioned or reconfigured by being plugged into different ones of a plurality of possible physical ports on the media device 104, 200, the control module 110, 202 may also account for the relative locations and performance characteristics for the particular ports of the media device 104, 200 being used. In some embodiments, an expected response for each wireless module 204, 206, 208 with respect to each of the other wireless modules 204, 206, 208 may be characterized for the particular media device 104, 200 prior to deployment, or alternatively, for a reference media device that is then stored or otherwise downloaded to instances of the media device 104, 200 (e.g., from the server 108) for subsequent usage.

For example, as described above, the device control module 110, 202 may select the WiFi module 208 as the probing module for diagnosing the RF4CE module 204 and command the WiFi module 208 to transmit dummy data having known characteristics over a probing channel that overlaps the channel of the RF4CE module 204. Additionally, the device control module 110, 202 may command the RF4CE module 204 to perform a channel assessment or energy detection concurrently to the dummy data transmission by the WiFi module 208 and obtain the corresponding measured energy level from the RF4CE module 204. Based on the characteristics of the dummy data, the device control module 110, 202 may determine an energy level expected to be measured by the RF4CE module 204 energy detection and compare the measured energy level to the expected energy level.

In exemplary embodiments, when the measured response is less than the expected response, the diagnostics process 300 determines an anomalous condition potentially exists with respect to the module under test and automatically initiates a reset of the module under test (task 312). In some embodiments, the diagnostics process 300 identifies a potential anomalous condition only when the measured response is less than the expected response by at least a threshold amount, which is chosen to account for interference, uncertainty, and any other factors that are likely to influence the measured response. That said, in some embodiments, the threshold amount may be equal to zero, in which case the diagnostics process 300 identifies a potential anomalous condition whenever the measured response is less than the expected response. For example, when the measured energy level obtained from the RF4CE module 204 is less than the expected energy level by at least a threshold amount (which may be equal to zero), the device control module 110, 202 automatically signals, commands, or otherwise instructs the RF4CE control module 212 to restart or otherwise reset the RF4CE module 204. In this regard, the power may be cycled for the antenna 216 and the RF core 214, for example, by decoupling the circuitry and components from the energy source or otherwise discharging any stored energy before restoring power to the antenna 216 and the RF core 214. In this manner, the antenna 216 and the RF core 214 may be restored to their initialized state. Additionally, the RF4CE control module 212 reboots, resets, or otherwise restarts itself to restore its initialized state. In this regard, if a component of the RF4CE module 204 is hanging, freezing, or otherwise locked up and influencing the ability of the RF4CE module 204 to receive messages or other data from the input device 106, restarting the RF4CE module 204 may resolve any potential anomalous condition so that the media device 104, 200 is capable of resuming normal communications with the input device 106.

Still referring to FIG. 3, in exemplary embodiments, the diagnostics process 300 maintains a diagnostics record for the module under test and updates the diagnostics record to reflect the newly identified potential anomalous condition (task 314). In this regard, in some embodiments, the control module 110, 202 may store or otherwise maintain (e.g., in memory 112) a record or log that maintains diagnostic information pertaining to any anomalous conditions identified by the control module 110, 202 for a particular wireless module under test. In other embodiments, the control module 110, 202 uploads diagnostic information pertaining to an identified anomalous condition to the server 108 via the network 107, with the server 108 maintaining the diagnostics record for the media device 104, 200. The diagnostics record may be utilized to track the date and/or time of the anomalous conditions, the total number of anomalous conditions identified, the total number of times the particular wireless module has been reset, the signal strength associated with the last good communication with the input device 106, system logs or other events, and the like.

In the illustrated embodiment, based on the diagnostics record, the diagnostics process 300 automatically identifies or otherwise determines whether the potential anomalous condition should be escalated for one or more remedial actions in addition to resetting the module (task 316), and if so, the diagnostics process 300 automatically initiates one or more additional remedial actions with respect to the module under test (task 318). The control module 110, 202 and/or the server 108 may calculate or otherwise determine one or more performance metrics indicative of the condition of the module under test and automatically identify when to escalate based on a performance metric violating an applicable escalation criterion. For example, the control module 110, 202 may calculate a number of anomalous conditions over a preceding time interval (e.g., the preceding 24 hours, the preceding week, or the like), an average duration of time between anomalous conditions (or rate of anomalous conditions), or the like, and determine to escalate the anomalous condition when the metric violates an applicable threshold (e.g., a maximum number of anomalous conditions over a particular time interval, a maximum frequency of anomalous conditions, a minimum duration of time between anomalous conditions, or the like). In exemplary embodiments, the escalation criteria are chosen such that no further remedial actions are initiated when resetting the wireless module under test is effective at restoring communications between the input device 106 and the media device 104, 200 for a sufficient duration of time such that further repair or replacement of the wireless module under test is unlikely.

In accordance with one or more embodiments, the control module 110, 202 generates or otherwise provides a notification to the user that a potential anomalous condition exists with respect to the module under test. For example, the control module 110, 202 may generate or otherwise provide a GUI on the display device 102 that indicates the media device 104, 200 is having difficulty receiving communications from the input device 106 and suggests or otherwise recommends the user inspect the surrounding environment for potential sources of interference, consider repositioning the media device 104, or undertake other suggested remedial actions that may improve the ability of the media device 104, 200 to receive communications from the input device 106. In other embodiments, the displayed notification on the display device 102 may recommend or otherwise suggest that the user contact customer service and/or schedule maintenance with respect to the media device 104, 200.

In some embodiments, the server 108 may automatically schedule or otherwise initiate maintenance with respect to the media device 104, 200. For example, when the server 108 stores or otherwise maintains the diagnostics record, in response to identifying the value for a performance metric associated with the media device 104, 200 violates an applicable escalation criterion, the server 108 may automatically generate and transmit a message (e.g., an e-mail, a text message, or the like), via the network 107, to the appropriate maintenance personnel or the appropriate maintenance organization that identifies the potential anomalous condition and/or the media device 104, 200 that should be serviced. In this regard, the server 108 may store or otherwise access customer information associated with the media device 104, 200 (e.g., customer contact information, address information, and the like) and provide that information in the message transmitted to maintenance personnel, who, in turn, may utilize that information to contact the customer and proceed accordingly.

Referring again to FIG. 3, in some embodiments, when the diagnostics process 300 is automatically initiated in response to a failure to receive a status message from the input device and the measured response is greater than or equal to the expected response, the diagnostics process 300 determines an anomalous condition exists with respect to the input device and initiates one or more remedial actions with respect to the input device or some other aspect of the media system (task 320). In such embodiments, the control module 110, 202 may determine that the wireless module under test is functioning normally or is otherwise capable of receiving messages from the input device 106 and that the interruption in communications between the input device 106 and the control module 110, 202 may be attributed to something outside of the media device 104, 200. For example, the control module 110, 202 may generate or otherwise provide a GUI on the display device 102 that indicates the media device 104, 200 is having difficulty receiving communications from the input device 106 and suggests or otherwise recommends the user recharge the input device 106 or inspect the input device 106 for any other issues, inspect the surrounding environment for potential sources of interference, consider repositioning the media device 104, or undertake other suggested remedial actions that may improve the ability of the media device 104, 200 to receive communications from the input device 106.

FIG. 4 depicts an exemplary sequence 400 of communications within the media system 100 of FIG. 1 in conjunction with the diagnostics process 300 of FIG. 3 in accordance with one or more exemplary embodiments. The exemplary sequence 400 depicts an embodiment where the media device 104, 200 periodically receives status messages from the input device 106 during normal operation via the RF4CE module 204 and automatically initiates the diagnostics process 300 with respect to the RF4CE module 204 in response to detecting an absence or failure to receive status messages. That said, it should be appreciated that FIG. 4 depicts merely one simplified representation of a communications sequence for purposes of explanation and is not intended to limit the subject matter described herein in any way.

Referring to FIG. 4, and with continued reference to FIGS. 1-3, the illustrated sequence 400 begins with the input device 106 periodically transmitting 402, 406 status messages to the RF4CE module 204 of the media device 104, 200, which, in turn, reroutes, retransmits or otherwise provides 404, 408 a corresponding message to the device control module 110, 202. As illustrated, at a subsequent point in time, a status message transmitted 410 by the input device 106 is not forwarded to the device control module 110, 202. The device control module 110, 202 may implement a timer or similar feature to monitor the duration of time that has elapsed since the most recent status message was received (e.g., by resetting the timer in response to receiving 408 a status message). In response to determining that an amount of time that has elapsed since the most recently received message exceeds a threshold amount of time, the device control module 110, 202 may automatically initiate the diagnostics process 300 with respect to the RF4CE module 204. The threshold amount of time may be chosen to allow for a certain number of consecutive missed status messages before initiating the diagnostics process 300. For example, if the input device 106 transmits 402, 406, 410 the status messages periodically every thirty seconds, the threshold amount of time may be chosen to be between sixty and ninety seconds to tolerate one missed status message and automatically initiate the diagnostics process 300 when two consecutive status messages have not been received at the device control module 110, 202.

Upon initiating the diagnostics process 300, the device control module 110, 202 may automatically select or otherwise identify the WiFi module 208 for use as the probing module based on the Bluetooth module 206 currently being paired with another device. Thereafter, the device control module 110, 202 commands, instructs, or otherwise signals 412 the control module 232 of the probing module 208 to tune, configure, or otherwise operate the RF core 234 and antenna 236 to transmit dummy data on a probing wireless communications channel that overlaps the RF4CE channel that will be monitored by the RF4CE module 204. In this manner, the device control module 110, 202 may instruct the probing module 208 to temporarily tune from an initial wireless channel that is currently (or was previously) being utilized by the probing module 208. The device control module 110, 202 also commands, instructs, or otherwise signals 414 the RF4CE control module 212 to configure or otherwise operate the RF core 214 and antenna 216 to detect the energy level for an RF4CE that overlaps the probing wireless communications channel. Thereafter, the probing control module 232 operates the RF core 234 and antenna 236 to transmit dummy data 416 over the probing wireless channel, while the RF4CE control module 212 operates the RF core 214 and antenna 216 to concurrently monitor the overlapped RF4CE channel and obtain a measured response for the energy level associated with that RF4CE channel. After the probing control module 232 operates the RF core 234 and antenna 236 to transmit dummy data 416 over the probing wireless channel, the probing control module 232 may reconfigure the RF core 234 and antenna 236 for the initial wireless channel that was being utilized prior to the diagnostics process 300.

As described above, the device control module 110, 202 receives or otherwise obtains 418 the measured energy level from the RF4CE control module 212 and compares the measured energy level to the energy level that would be expected to be received by the RF4CE module 204 based on one or more characteristics of the dummy data transmitted 416 by the probing module 208 and/or the physical relationship between the probing module 208 and the RF4CE module 204 (e.g., the separation distance between the modules 204, 208, the relative orientations of the antennas 216, 236, and the like). When the measured energy level is less than the expected energy level by a sufficient margin, the device control module 110, 202 determines an anomalous condition may exist with respect to the RF4CE module 204 and automatically commands, instructs, or otherwise signals 420 the RF4CE control module 212 to reset the RF4CE module 204. In this regard, the RF4CE control module 212 may temporarily discharge, decouple, or otherwise de-energize the RF core 214 and the antenna 216 to restore them to an initialized state and restart or otherwise reset itself to its initialized state. In exemplary embodiments, when resetting the RF4CE module 204 remedies the anomalous condition, the RF4CE module 204 resumes receiving status messages from the input device 106 and rerouting received messages to the device control module 110, 202 in a normal manner.

In embodiments, where resetting the RF4CE module 204 does not remedy the anomalous condition or the incidence of anomalous conditions detected by the device control module 110, 202 exceeds one or more escalation criteria, the device control module 110, 202 may automatically initiate one or more remedial actions with respect to the RF4CE module 204. For example, the device control module 110, 202 may generate or otherwise provide 422 a GUI on the display device 102 that notifies the user of the potential anomalous condition with respect to a communications module 122, 204, 206, 208 of media device 104, 200 and indicates suggested or recommended remedial actions that may be performed by the user (e.g., inspecting the input device 106, the media device 104, 200, and/or the surrounding operating environment, contacting customer service, and/or the like). Additionally or alternatively, in some embodiments, the device control module 110, 202 may generate or otherwise provide 424, via network 107, a notification to a remote server 108 (e.g., an autocreated maintenance request message). In response, the remote server 108 may facilitate automatic notifications of maintenance personnel, automatic scheduling of maintenance visits, and the like. In yet other embodiments, the device control module 110, 202 may generate or otherwise provide 424 a diagnostics message indicative of the diagnosis of the RF4CE module 204 to the remote server 108, which, in turn, may utilize its own escalation criteria to determine when to automatically notify maintenance personnel, automatically schedule maintenance visits, and the like.

Referring again to FIGS. 1-3, it should be noted that although the subject matter is described above in the context of a media device 104, 200 including multiple wireless communications modules 204, 206, 208, in alternative embodiments, the subject matter described herein may also be implemented with media devices that do not include a separate wireless communications module that is available for use as a probing module. In such embodiments, instead of configuring and operating a probing module of the media device (e.g., tasks 302, 306), the device control module 110, 202 generates or otherwise provides a GUI on the display device 102 that instructs a user to operate another device to create interference on the channel being monitored by the module under test. For example, the device control module 110, 202 may instruct the user to maintain one or more buttons on the input device 106 in a depressed state or to operate another device in a manner that is likely to interfere with the channel being monitored. The device control module 110, 202 may instruct the user to manually set another electronic device (e.g., the user's phone, computer, or the like) into a wireless scan mode such that it will communicate within a channel that overlaps the channel being monitored for at least a portion of the duration of the scan mode. Alternatively, the device control module 110, 202 may instruct the user to operate a microwave or another similar device that is likely to produce electromagnetic interference within the channel being monitored. The GUI on the display device 102 may include one or more GUI elements (e.g., buttons or the like) that may also be manipulated by the user to synchronize the operation of the external device with the media device 104, 200, such that the wireless module under test monitors its configured channel concurrent to the external device generating interference that overlaps the channel (e.g., task 308). Thereafter, the device control module 110, 220 receives the measured response from the wireless module under test, and when the measured response is indicative of a failure to receive or detect any communications on the configured channel, the device control module 110, 220 initiates a reset of the wireless module under test and potentially other remedial actions in a similar manner as described above (e.g., tasks 310, 312, 314, 316, 318).

To briefly summarize, the subject matter described herein allows for the functionality of a wireless module of a device to be diagnosed and reset with limited manual intervention. For example, if a wireless module of a device is experiencing latchup or some other electrostatic discharge condition, an anomalous hardware state or condition, a firmware and/or software hang, or the like, the anomalous operation of the wireless module may be self-diagnosed and automatically reset by the device without any action by a user. Thus, the user experience may be improved by restoring the communications functionality of the device without burdening the user with diagnosing or remedying the problem.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to wireless communications, protocols and/or specifications, channel assessments, resetting or restarting devices, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method comprising:
   detecting, by a control module of a device including a first wireless module communicating on a first wireless channel, an absence of communications on the first wireless channel;
   in response to the absence, instructing, by the control module, a second wireless module of the device to transmit diagnostic data on a second wireless channel different from the first wireless channel, wherein:
      the first wireless module supports a first communications protocol and the second wireless module supports a second communications protocol different from the first wireless communications protocol within a common frequency band; and
      at least a portion of the second wireless channel overlaps at least a portion of the first wireless channel;
   instructing, by the control module, the first wireless module of the device to monitor the first wireless channel concurrent to at least some of the diagnostic data transmission on the second wireless channel by the second wireless module of the device;
   determining an expected response on the first wireless channel to the diagnostic data transmitted on the second wireless channel by the second wireless module based on one or more characteristics of the diagnostic data transmitted on the second wireless channel;
   obtaining, by the control module from the first wireless module, a measured response associated with the first wireless channel concurrent to the diagnostic data transmitted on the second wireless channel; and
   automatically resetting, by the control module, the first wireless module when the measured response is less than the expected response.

2. The method of claim 1, wherein instructing the second wireless module comprises instructing the second wireless module to tune to the second wireless channel and transmit the diagnostic data after tuning to the second wireless channel.

3. The method of claim 1, further comprising selecting the second wireless channel from among a plurality of wireless channels supported by the second wireless module based on an amount of overlap between the portion of the second wireless channel and the portion of the first wireless channel.

4. The method of claim 1, further comprising selecting the second wireless channel from among a plurality of wireless channels supported by the second wireless module based on a difference between a center frequency of the second wireless channel and a center frequency of the first wireless channel.

5. The method of claim 1, wherein detecting the absence comprises detecting the absence of communications with an input device on the first wireless channel prior to instructing the second wireless module to transmit the diagnostic data on the second wireless channel in response to the absence.

6. The method of claim 5, the input device comprising a remote control including one or more user input elements for receiving input from a viewer of a display device coupled to the device, wherein instructing the second communications module comprises instructing the second communications module in response to the control module detecting an absence of receiving a status message from the input device at an expected periodic interval.

7. The method of claim 1, wherein:
   instructing the first wireless module comprises instructing the first wireless module to detect a measured energy level associated with the first wireless channel concurrent to the diagnostic data transmitted on the second wireless channel;
   determining the expected response to the diagnostic data comprises determining an expected energy level associated with the first wireless channel based on the one or more characteristics of the diagnostic data transmitted on the second wireless channel by the second wireless module; and
   automatically resetting comprises automatically resetting the first wireless module when the measured energy level is less than the expected energy level.

8. The method of claim 1, wherein at least one of a center frequency of the first wireless channel and a bandwidth of the first wireless channel is different from that of the second wireless channel.

9. A device comprising:
   a first wireless module supporting a first communications protocol to communicate on a first wireless channel;
   a second wireless module supporting a second communications protocol different from the first wireless communications protocol within a common frequency band; and
   a control module coupled to the first wireless module and the second wireless module to detect an absence of communications on the first wireless channel, instruct the second wireless module to transmit diagnostic data on a second wireless channel in response to the absence, instruct the first wireless module to monitor the first wireless channel concurrent to at least some of the diagnostic data transmission by the second wireless module of the device, determine an expected response on the first wireless channel to the diagnostic data transmitted on the second wireless channel by the second wireless module based on one or more characteristics of the diagnostic data, obtain a measured response associated with the first wireless channel concurrent to the diagnostic data transmitted on the second wireless channel from the first wireless module, and automatically initiate a reset of the first wireless module when the measured response is less than the expected response, wherein at least a portion of the second wireless channel overlaps at least a portion of the first wireless channel and the first wireless channel is different from the second wireless channel.

10. The device of claim 9, the second communications protocol comprising a plurality of wireless channels, wherein the control module selects the second wireless channel from among the plurality of wireless channels based on an amount of overlap between the portion of the second wireless channel and the portion of the first wireless channel.

11. The device of claim 9, wherein a center frequency of the first wireless channel is different from a center frequency of the second wireless channel.

12. The device of claim 9, wherein a bandwidth of the first wireless channel is different from a bandwidth of the second wireless channel.

13. The device of claim 9, wherein the diagnostic data comprises an amount of data configured to provide a duration of time for transmission that is greater than or equal to a duration of time during which the first wireless module will monitor the first wireless channel.

14. The device of claim 9, wherein the diagnostic data comprises a dummy packet of data having a packet length equal to a maximum packet length allowed by the second communications protocol.

15. The device of claim 9, wherein:
the first communications protocol comprises an IEEE 802.15 protocol; and
the second communications protocol comprises an IEEE 802.11 protocol.

16. A media system comprising:
an input device supporting a first communications protocol to communicate via a first wireless channel; and
a media device comprising:
a first wireless module supporting the first communications protocol to communicate with the input device via the first wireless channel;
a second wireless module supporting a second communications protocol different from the first wireless communications protocol within a common frequency band; and
a control module coupled to the first wireless module and the second wireless module to:
detect an absence of communications with the input device on the first wireless channel;
instruct the second wireless module to transmit diagnostic data on a second wireless channel different from the first wireless channel in response to the absence, wherein at least a portion of the second wireless channel overlaps at least a portion of the first wireless channel;
instruct the first wireless module to monitor the first wireless channel concurrent to at least some of the diagnostic data transmission by the second wireless module;
determine an expected response on the first wireless channel to the diagnostic data transmitted on the second wireless channel by the second wireless module based on one or more characteristics of the diagnostic data;
obtain, from the first wireless module, a measured response associated with the first wireless channel concurrent to the diagnostic data transmitted on the second wireless channel; and
automatically initiate a reset of the first wireless module when the measured response is less than the expected response.

17. The media system of claim 16, further comprising a display device coupled to the media device, wherein:
the input device comprises a remote control; and
the media device comprises a set-top box.

18. The media system of claim 17, wherein the control module is coupled to the display device to generate a graphical user interface on the display device based at least in part on the measured response.

19. The media system of claim 16, wherein at least one of a center frequency of the first wireless channel and a bandwidth of the first wireless channel is different from that of the second wireless channel.

20. The media system of claim 16, wherein the diagnostic data comprises an amount of data configured to provide a duration of time for transmission that is greater than or equal to a duration of time during which the first wireless module will monitor the first wireless channel.

* * * * *